(12) United States Patent
Li et al.

(10) Patent No.: US 9,686,805 B2
(45) Date of Patent: Jun. 20, 2017

(54) METHOD FOR PROCESSING SERVING GRANT VALUE, USER EQUIPMENT AND NETWORK DEVICE

(71) Applicant: Huawei Technologies Co., Ltd., Shenzhen, Guangdong (CN)

(72) Inventors: Bingzhao Li, Beijing (CN); Chuanfeng He, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 183 days.

(21) Appl. No.: 14/454,485

(22) Filed: Aug. 7, 2014

(65) Prior Publication Data
US 2014/0348112 A1 Nov. 27, 2014

Related U.S. Application Data

(63) Continuation of application No. PCT/CN2013/075407, filed on May 9, 2013.

(30) Foreign Application Priority Data

May 11, 2012 (CN) .......................... 2012 1 0146407
Apr. 12, 2013 (CN) .......................... 2013 1 0127512

(51) Int. Cl.
*H04W 72/12* (2009.01)
*H04W 52/22* (2009.01)
(Continued)

(52) U.S. Cl.
CPC ....... *H04W 72/1294* (2013.01); *H04L 5/0092* (2013.01); *H04W 24/08* (2013.01);
(Continued)

(58) Field of Classification Search
None
See application file for complete search history.

(56) References Cited

U.S. PATENT DOCUMENTS 7,072,651 B2 7/2006 Jiang et al.
7,577,432 B2 8/2009 Della-Torre
(Continued)

FOREIGN PATENT DOCUMENTS

CN 1984068 A 6/2007
CN 101321116 A 12/2008
(Continued)

OTHER PUBLICATIONS

"Discussion on the non-serving RG down," 3GPP TSG-RAN WG2 Meeting #70, Montreal, Canada, R2-103017, pp. 1-3, $3^{rd}$ Generation Partnership Project, Valbonne, France (May 10-14, 2010).
(Continued)

*Primary Examiner* — Brandon Renner
*Assistant Examiner* — Jay Vogel
(74) *Attorney, Agent, or Firm* — Leydig, Voit & Mayer, Ltd.

(57) ABSTRACT

Embodiments of the present invention provide a method for processing a serving grant value, a user equipment and a network device, so that it can prevent a serving grant value of a UE from being excessively low. The method includes: taking, by a user equipment, a maximum value of historical values of a power ratio of a data channel to a control channel as a maximum power ratio value after receiving a non-serving relative grant down command sent by a network device; and obtaining, by the user equipment, a first serving grant value according to the maximum power ratio value and a first threshold, where the first threshold is a threshold of a serving grant value or a threshold of the power ratio of the data channel to the control channel.

19 Claims, 9 Drawing Sheets

(51) Int. Cl.
  *H04W 52/32* (2009.01)
  *H04L 5/00* (2006.01)
  *H04W 24/08* (2009.01)
  *H04W 52/36* (2009.01)
  *H04W 52/26* (2009.01)
  *H04W 52/16* (2009.01)

(52) U.S. Cl.
  CPC ......... *H04W 52/226* (2013.01); *H04W 52/26* (2013.01); *H04W 52/325* (2013.01); *H04W 52/367* (2013.01); *H04W 52/16* (2013.01); *Y02B 60/50* (2013.01)

(56) References Cited

U.S. PATENT DOCUMENTS

| | | | |
|---|---|---|---|
| 7,590,417 | B2 | 9/2009 | Jiang |
| 7,616,954 | B2 | 11/2009 | Jiang |
| 7,684,793 | B2 | 3/2010 | Jiang |
| 7,873,015 | B2 | 1/2011 | Gallagher et al. |
| 7,873,358 | B2 | 1/2011 | Jiang |
| 7,929,953 | B2 | 4/2011 | Jiang |
| 8,023,425 | B2 | 9/2011 | Raleigh |
| 2007/0073895 | A1 | 3/2007 | Sebire et al. |
| 2008/0070583 | A1* | 3/2008 | Tseng ............... H04W 52/228 455/450 |
| 2008/0254804 | A1* | 10/2008 | Lohr ................. H04W 72/14 455/442 |
| 2009/0103479 | A1 | 4/2009 | Goto et al. |
| 2010/0023833 | A1 | 1/2010 | Pan et al. |
| 2010/0234026 | A1 | 9/2010 | Tenny et al. |
| 2011/0287800 | A1 | 11/2011 | Aoyagi et al. |
| 2012/0044875 | A1 | 2/2012 | Kurtti et al. |
| 2012/0275403 | A1* | 11/2012 | Zhang ............... H04B 7/0404 370/329 |

FOREIGN PATENT DOCUMENTS

| | | |
|---|---|---|
| CN | 101420744 A | 4/2009 |
| CN | 101562895 A | 10/2009 |
| CN | 102118782 A | 7/2011 |
| CN | 102415168 A | 4/2014 |
| RU | 2385550 C2 | 3/2010 |
| WO | WO 2010128201 A1 | 11/2010 |

OTHER PUBLICATIONS

"Universal Mobile Telecommunications System (UMTS); Medium Access Control (MAC) protocol specification (3GPP TS 25.321 version 9.1.0 Release 9)," ETSI TS 125 321 V9.1.0, pp. 1-196, $3^{rd}$ Generation Partnership Project, Valbonne, France (Feb. 2010).

"$3^{rd}$ Generation Partnership Project; Technical Specification Group Radio Access Network; Medium Access Control (MAC) protocol specification (Release 9)," 3GPP TS 25.321, V9.7.0, pp. 10-12, 90-93, 143-145, $3^{rd}$ Generation Partnership Project, Valbonne, France (Sep. 2011).

"$3^{rd}$ Generation Partnership Project; Technical Specification Group Radio Access Network; Medium Access Control (MAC) protocol specification (Release 11)," 3GPP TS 25.321, V11.3.0, pp. 1-207, $3^{rd}$ Generation Partnership Project, Valbonne, France (Dec. 2012).

"$3^{rd}$ Generation Partnership Project; Technical Specification Group Radio Access Network; Medium Access Control (MAC) protocol specification (Release 11)," 3GPP TS 25.321, V11.0.0, pp. 1-198, $3^{rd}$ Generation Partnership Project, Valbonne, France (Dec. 2011).

"$3^{rd}$ Generation Partnership Project; Technical Specification Group Radio Access Network; Radio Resource Control (RRC); Protocol specification (Release 11)," 3GPP TS 25.331, V11.0.0, pp. 1-1911, $3^{rd}$ Generation Partnership Project, Valbonne, France (Mar. 2012).

Notice of Allowance in cognate Chinese Application No. 201310127512 (Jan. 10, 2017).

* cited by examiner

METHOD FOR PROCESSING SERVING GRANT VALUE, USER EQUIPMENT AND NETWORK DEVICE

CROSS-REFERENCE TO RELATED APPLICATIONS

This application is a continuation of International Patent Application No. PCT/CN2013/075407, filed on May 9, 2013, which claims priority to Chinese Patent Application No. 201210146407.6, filed on May 11, 2012, and Chinese Patent Application No. 201310127512.X, filed on Apr. 12, 2013, all of which are hereby incorporated by reference in their entireties.

TECHNICAL FIELD

The present invention relates to the field of communications, and in particular, to a method for processing a serving grant value, a user equipment and a network device.

BACKGROUND

A high speed uplink packet access (HSUPA) technology is a transmission technology adopted in the uplink of wideband code division multiple access (WCDMA). The HSUPA adopts a synchronization HARQ (Hybrid Automatic Repeat Request) of the multi-path stop-and-wait to perform transmission, and is implemented based on that a network device adjusts a serving grant (SG) value of a user equipment (UE) through a grant, where the serving grant value is used for the UE to determine available power for sending data.

SG values sent by the network device are classified into two types, one type is referred to as an absolute grant (AG) value, and the other type is referred to as a relative grant (RG) value, where the RG value is classified into a serving RG value and a non-serving RG value, the service RG value is an RG value sent through a serving radio link set, and the non-serving RG value is an RG value sent through a non-serving radio link. The non-serving absolute grant value includes two values: Hold and Down. When the UE receives a Hold command, processing may not be performed, and when the UE receives a Down command, the SG value is reduced.

Currently, in some scenarios, when a non-serving Node B sends a non-serving RG value, no specific UE is decoded, that is, when interference generated by a UE is controlled, the strength of interference generated by UEs is not distinguished; instead, a group of UEs are uniformly controlled. Generally, a Node B makes reference to only its own interference, and does not analyze which UE causes the interference. When the interference of the Node B is excessively high, a Down command is sent, the UE may perform serving grant update after receiving the command, and a UE with large interference reduces an SG value to reduce available power, but a UE with small interference also reduces an SG value to reduce use power. In this way, a UE whose SG value is quite small originally may further reduce the SG value, or even may decrease the SG value to a minimum SG value 0. When the SG value is decreased to 0, available power of the UE may be insufficient, thereby affecting normal communications of the UE.

SUMMARY

Embodiments of the present invention provide a method for processing a serving grant value, a user equipment and a network device, so as to prevent a serving grant value of a UE being excessively low, and avoid that normal communications of the UE is affected due to excessively low available power.

The embodiments of the present invention may specifically be implemented through the following technical solutions.

A method for processing a serving grant value is provided and includes:

taking, by a user equipment, a maximum value of historical values of a power ratio of a data channel to a control channel as a maximum power ratio value after receiving a non-serving relative grant down command sent by a network device; and obtaining, by the user equipment, a first serving grant value according to the maximum power ratio value and a first threshold, where the first threshold is a threshold of a serving grant value or a threshold of the power ratio of a data channel to a control channel.

With reference to the first aspect, in a first possible implementation manner, each of the historical values of the power ratio of the data channel to the control channel is a saved power ratio of a data channel to a control channel, where the saved power of the data channel to the control channel is used for sending data in a transmission time interval before a previous transmission time interval on each hybrid automatic repeat request process.

With reference to the first aspect or the first possible implementation manner of the first aspect, in a second possible implementation manner, the first threshold is set by the user equipment; or the first threshold is a first threshold received by the user equipment and sent by the network device.

With reference to the first possible implementation manner or the second possible implementation manner of the first aspect, in a third possible implementation manner, the method further includes:

taking, by the user equipment, a minimum value among the first serving grant value, a serving grant value of the user equipment before being updated according to the non-serving relative grant down command, and a maximum serving grant value as a serving grant value of the user equipment.

With reference to the second possible implementation manner of the first aspect, in a fourth possible implementation manner, that the first threshold is a first threshold received by the user equipment and sent by the network device includes:

that the first threshold is a first threshold received by the user equipment and sent through system information broadcast or through dedicated signaling by the network device.

With reference to the second possible implementation manner of the first aspect, in a fifth possible implementation manner, that the first threshold is set by the user equipment includes: that the user equipment obtains the first threshold according to a power ratio of a reference transmission block.

With reference to the fifth possible implementation manner of the first aspect, in a sixth possible implementation manner, that the user equipment obtains the first threshold according to a power ratio of a reference transmission block includes:

that the user equipment determines, according to the power ratio of the reference transmission block, a power ratio required for a minimum block length that is used for transmitting data; and that the user equipment determines the first threshold according to the power ratio required for a minimum block length that is used for transmitting data or according to a serving grant value corresponding to the power ratio required for a minimum block length that is used for transmitting data.

With reference to the first aspect, in a seventh possible implementation manner, when the first threshold is the threshold of the serving grant value, the obtaining, by the user equipment, a first serving grant value according to the maximum power ratio value and the first threshold includes:

searching, by the user equipment, a serving grant table for a power ratio of the data channel to the control channel greater than or equal to the maximum power ratio value;

selecting, by the user equipment, a minimum power ratio value from the power ratio of the data channel to the control channel greater than or equal to the maximum power ratio value, and determining, according to the serving grant table, a serving grant value corresponding to the minimum power ratio value; and setting, by the user equipment, the first threshold as the first serving grant value when the serving grant value corresponding to the minimum power ratio value is smaller than or equal to the first threshold; or setting, by the user equipment, a value obtained by subtracting 1 from the serving grant value corresponding to the minimum power ratio value as the first serving grant value when the serving grant value corresponding to the minimum power ratio value is greater than or equal to the first threshold.

With reference to the first aspect, in an eighth possible implementation manner, when the first threshold is the threshold of the power ratio of the data channel to the control channel, the obtaining, by the user equipment, a first serving grant value according to the maximum power ratio value and the first threshold includes:

when the maximum power ratio value is smaller than or equal to the first threshold value, determining, by the user equipment, according to the serving grant table, a serving grant value corresponding to the first threshold, and setting the serving grant value corresponding to the first threshold as the first serving grant value; or when the maximum power ratio value is greater than or equal to the first threshold, searching, by the user equipment, a serving grant table for a power ratio of the data channel to the control channel greater than or equal to the maximum power ratio value, and selecting a minimum power ratio value from the power ratio of the data channel to the control channel greater than or equal to the maximum power ratio value; and determining, by the user equipment, according to the serving grant table, a serving grant value corresponding to the minimum power ratio value, and setting a value obtained by subtracting 1 from the serving grant value corresponding to the minimum power ratio value as the first serving grant value.

With reference to the first aspect, in a ninth possible implementation manner, when the first threshold is the threshold of the power ratio of the data channel to the control channel, the obtaining, by the user equipment, a first serving grant value according to the maximum power ratio value and the first threshold includes:

when the maximum power ratio value is smaller than or equal to the first threshold, determining, by the user equipment, according to a serving grant table, a serving grant value corresponding to the first threshold, and setting the serving grant value corresponding to the first threshold as the first serving grant value; or when the maximum power ratio value is greater than or equal to the first threshold, searching, by the user equipment, the serving grant table for a power ratio of the data channel to the control channel greater than or equal to the maximum power ratio value, and selecting a minimum power ratio value from the power ratio of the data channel to the control channel greater than or equal to the maximum power ratio value; and determining, by the user equipment, according to the serving grant table, a serving grant value corresponding to the minimum power ratio value, and setting a value obtained by subtracting 1 from the serving grant value corresponding to the minimum power ratio value as the first serving grant value.

With reference to the first aspect, in a tenth possible implementation manner, the obtaining, by the user equipment, a first serving grant value according to the maximum power ratio value and the first threshold includes:

when the first threshold is the threshold of the power ratio of the data channel to the control channel, reducing, by the user equipment, the first serving grant value of the user equipment according to the non-serving relative grant down command when the maximum power ratio value is greater than or equal to the first threshold; or not executing the non-serving relative grant down command when the maximum power ratio value is smaller than or equal to the first threshold.

With reference to the first aspect, in an eleventh possible implementation manner, the obtaining, by the user equipment, a first serving grant value according to the maximum power ratio value and the first threshold includes:

when the first threshold is the threshold of the serving grant value, searching, by the user equipment, a serving grant table for a power ratio of the data channel to the control channel greater than or equal to the maximum power ratio value;

selecting, by the user equipment, a minimum power ratio value from the power ratio of the data channel to the control channel greater than or equal to the maximum power ratio value, and determining, according to the serving grant table, a serving grant value corresponding to the minimum power ratio value; and reducing, by the user equipment, the first serving grant value of the user equipment according to the non-serving relative grant down command when the serving grant value corresponding to the minimum power ratio value is greater than or equal to the first threshold; or not executing, by the user equipment, the non-serving relative grant down command when the serving grant value corresponding to the minimum power ratio value is smaller than or equal to the first threshold.

With reference to the seventh possible implementation manner to the ninth possible implementation manner of the first aspect, in a twelfth possible implementation manner, the serving grant table includes correspondence between a power ratio of a data channel to a control channel and a serving grant value, where the power ratio of the data channel to the control channel is adopted at the time of transmitting data.

In a second aspect, another method for processing a serving grant value is provided and includes:

sending, by a network device, a first threshold to a user equipment, so that the user equipment obtains a first serving grant value according to a maximum power ratio value and the first threshold, where the maximum power ratio value is a maximum value of historical values of a power ratio of a data channel to a control channel, and the first threshold is a threshold of a serving grant value or a threshold of the power ratio of the data channel to the control channel.

With reference to the second aspect, in a first possible implementation manner, each of the historical values of the power ratio of the data channel to the control channel is a power ratio of a data channel to a control channel, where the power ratio of the data channel to the control channel is used for sending data in a transmission time interval before a previous transmission time interval on each hybrid automatic repeat request process.

With reference to the second aspect or the first possible implementation manner of the second aspect, in a second possible implementation manner, the sending, by a network device, a first threshold to a user equipment includes:

sending, by the network device, the first threshold to the user equipment through system information broadcast or through dedicated signaling.

With reference to the second aspect or the first possible implementation manner of the second aspect, in a third possible implementation manner, before the sending, by a network device, a first threshold to a user equipment, the method further includes:

obtaining, by the network device, the first threshold according to a power ratio of a reference transmission block.

With reference to the third possible implementation manner of the second aspect, in a fourth possible implementation manner, the obtaining, by the network device, the first threshold according to the power ratio of the reference transmission block includes:

determining, by the network device, according to the power ratio of the reference transmission block, a power ratio required for a minimum block length that is used for transmitting data; and determining, by the network device, the first threshold according to the power ratio required for a minimum block length that is used for transmitting data or according to a serving grant value corresponding to the power ratio required for a minimum block length that is used for transmitting data.

In a third aspect, a user equipment is provided and includes:

a selecting unit, configured to take a maximum value of historical values of a power ratio of a data channel to a control channel as a maximum power ratio value after receiving a non-serving relative grant down command sent by a network device; and a processing unit, configured to obtain a first serving grant value according to the maximum power ratio value and a first threshold, where the first threshold is a threshold of a serving grant value or a threshold of the power ratio of the data channel to the control channel.

With reference to the third aspect, in a first possible implementation manner, each of the historical values of the power ratio of the data channel to the control channel is a saved power ratio of a data channel to a control channel, where the saved power ratio of the data channel to the control channel is used for sending data in a transmission time interval before a previous transmission time interval on each hybrid automatic repeat request process.

With reference to the third aspect or the first possible implementation manner of the third aspect, in a second possible implementation manner, the user equipment further includes:

a setting unit, configured to set the first threshold; or a receiving unit, configured to receive the first threshold sent by the network device.

With reference to the third aspect or the first possible implementation manner of the third aspect, in a third possible implementation manner, the user equipment further includes:

an updating unit, configured to take a minimum value among the first serving grant value, a serving grant value of the user equipment before being updated according to the non-serving relative grant down command, and a maximum serving grant value as a serving grant value of the user equipment.

With reference to the second possible implementation manner of the third aspect, in a fourth possible implementation manner, the receiving unit is specifically configured to:

receive the first threshold sent through system information broadcast or through dedicated signaling by the network device.

With reference to the second possible implementation manner of the third aspect, in a fifth possible implementation manner, the setting unit is specifically configured to:

obtain the first threshold according to a power ratio of a reference transmission block.

With reference to the fifth possible implementation manner of the third aspect, in a sixth possible implementation manner, the setting unit is specifically configured to:

determine, according to the power ratio of the reference transmission block, a power ratio required for a minimum block length that is used for transmitting data; and determine the first threshold according to the power ratio required for a minimum block length that is used for transmitting data or according to a serving grant value corresponding to the power ratio required for a minimum block length that is used for transmitting data.

With reference to the third aspect, in a seventh possible implementation manner, the processing unit includes:

a first searching sub-unit, configured to search a serving grant table for a power ratio of the data channel to the control channel greater than or equal to the maximum power ratio value;

a first selecting sub-unit, configured to select a minimum power ratio value from the power ratio of the data channel to the control channel greater than or equal to the maximum power ratio value, and determine, according to the serving grant table, a serving grant value corresponding to the minimum power ratio value; and a first setting sub-unit, configured to set the first threshold as the first serving grant value when the serving grant value corresponding to the minimum power ratio value is smaller than or equal to the first threshold; or set a value obtained by subtracting 1 from the serving grant value corresponding to the minimum power ratio value as the first serving grant value when the serving grant value corresponding to the minimum power ratio value is greater than or equal to the first threshold.

With reference to the third aspect, in an eighth possible implementation manner, the processing unit includes:

a second searching sub-unit, configured to search a serving grant table for a power ratio of the data channel to the control channel greater than or equal to the maximum power ratio value;

a second selecting sub-unit, configured to select a minimum power ratio value from the power ratio of the data channel to the control channel greater than or equal to the maximum power ratio value, and determine, according to the serving grant table, a serving grant value corresponding to the minimum power ratio value; and a second setting sub-unit, configured to set a maximum value between a value obtained by subtracting 1 from the serving grant value corresponding to the minimum power ratio value and the first threshold as the first serving grant value.

With reference to the third aspect, in a ninth possible implementation manner, when the first threshold is the threshold of the power ratio of the data channel to the control channel, the processing unit includes:

a third setting sub-unit, configured to, when the maximum power ratio value is smaller than or equal to the first threshold, determine, according to a serving grant table, a serving grant value corresponding to the first threshold, and set the serving grant value corresponding to the first threshold as the first serving grant value; and a third searching sub-unit, configured to, when the maximum power ratio value is greater than or equal to the first threshold, search the serving grant table for a power ratio of the data channel to the control channel greater than or equal to the maximum power ratio value, so that a third selecting sub-unit selects a minimum power ratio value from the power ratio of the data channel to the control channel greater than or equal to the maximum power ratio value, where the third setting sub-unit is further configured to determine, according to the serving grant table, a serving grant value corresponding to the minimum power ratio value, and set a value obtained by subtracting 1 from the serving grant value corresponding to the minimum power ratio value as the first serving grant value.

With reference to the third aspect, in a tenth possible implementation manner, the processing unit includes:

a fourth setting sub-unit, configured to, when the first threshold is the threshold of the power ratio of the data channel to the control channel, reduce the first serving grant value of the user equipment according to the non-serving relative grant down command when the maximum power ratio value is greater than or equal to the first threshold, or where the fourth setting sub-unit is further configured, when the first threshold is the threshold of the power ratio of the data channel to the control channel, not to execute the non-serving relative grant down command when the maximum power ratio value is smaller than or equal to the first threshold.

With reference to the third aspect, in an eleventh possible implementation manner, the processing unit is specifically configured to:

when the first threshold is the threshold of the serving grant value, search a serving grant table for a power ratio of the data channel to the control channel greater than or equal to the maximum power ratio value; and select a minimum power ratio value from the power ratio of the data channel to the control channel greater than or equal to the maximum power ratio value, and determine, according to the serving grant table, a serving grant value corresponding to the minimum power ratio value; and reduce the first serving grant value of the user equipment according to the non-serving relative grant down command when the serving grant value corresponding to the minimum power ratio value is greater than or equal to the first threshold; or configured not to execute the non-serving relative grant down command when the serving grant value corresponding to the minimum power ratio value is smaller than or equal to the first threshold.

In a fourth aspect, a network device is further provided and includes:

a sending unit, configured to send a first threshold to a user equipment, so that the user equipment obtains a first serving grant value according to a maximum power ratio value and the first threshold, where the maximum power ratio value is a maximum value of historical values of a power ratio of a data channel to a control channel, and the first threshold is a threshold of a serving grant value or a threshold of the power ratio of the data channel to the control channel.

With reference to the fourth aspect, in a first possible implementation manner, each of the historical values of the power ratio of the data channel to the control channel is a power ratio of a data channel to a control channel, where the power ratio of the data channel to the control channel is used for sending data in a transmission time interval before a previous transmission time interval on each hybrid automatic repeat request process.

With reference to the fourth aspect or the first possible implementation manner of the fourth aspect, in a second possible implementation manner, the sending unit is specifically configured to:

send the first threshold to the user equipment through system information broadcast or through dedicated signaling.

With reference to the fourth aspect or the first possible implementation manner of the fourth aspect, in a third possible implementation manner, the network device further includes:

a threshold obtaining unit, configured to obtain the first threshold according to a reference transmission block power ratio.

With reference to the third possible implementation manner of the fourth aspect, in a fourth possible implementation manner, the threshold obtaining unit is specifically configured to:

determine, according to the power ratio of the reference transmission block, a power ratio required for a minimum block length that is used for transmitting data; and determine the first threshold according to the power ratio required for a minimum block length that is used for transmitting data or according to a serving grant value corresponding to the power ratio required for a minimum block length that is used for transmitting data.

With reference to the fourth aspect or one of the first possible implementation manner to the third possible implementation manner of the fourth aspect, in a fourth possible implementation manner, the network device is a radio network controller.

With the method for processing a serving grant value, the user equipment and the network device provided in the embodiments of the present invention, by obtaining a first serving grant value according to a power maximum value of historical values of a power ratio of a data channel to a control channel and according to a first threshold, a first serving grant value of a user equipment can be prevented from being excessively low.

DESCRIPTION OF EMBODIMENTS

To make the objectives, technical solutions, and advantages of the present invention more comprehensible, the technical solutions provided in the present invention are described in further detail in the following with reference to the accompanying drawings and embodiments.

Figure 1:
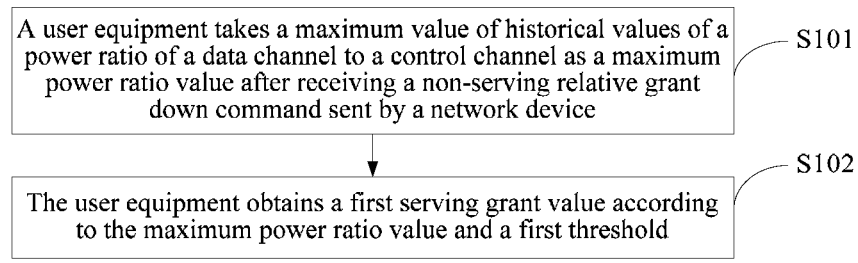
FIG. 1 is a schematic flow chart of a method for processing a serving grant value provided in an embodiment of the present invention.

An embodiment of the present invention provides a method for processing a serving grant value, and as shown in FIG. 1, the method includes the following steps.

S101: A user equipment takes a maximum value of historical values of a power ratio of a data channel to a control channel as a maximum power ratio value after receiving a non-serving relative grant down command sent by a network device, where each of the historical values of the power ratio of the data channel to the control channel is a saved power ratio of a data channel to a control channel, where the saved power ratio of the data channel to the control channel is used for sending data in a transmission time interval before a previous transmission time interval on each hybrid automatic repeat request process.

S102: The user equipment obtains a first serving grant value according to the maximum power ratio value and a first threshold. The first serving grant value refers to a serving grant value used for adjusting a final serving grant value of the user equipment and updated according to a non-serving relative grant down command by the user equipment after the non-serving relative grant down command is received.

The first threshold may be a threshold of a serving grant value or a threshold of the power ratio of the data channel to the control channel. The first threshold may be set by the user equipment; or may be set by the network device, and then the network device sends the first threshold to the user equipment.

With the method for processing a serving grant value provided in the embodiment of the present invention, a first serving grant value is obtained according to a power maximum value of historical values of a power ratio of a data channel to a control channel and according to a first threshold, so that a first serving grant value of a user equipment can be prevented from being excessively low, thereby preventing a serving grant value of a user from being excessively low.

Further, in this embodiment, the user equipment may select a minimum value from the selected maximum power ratio value, and then obtain the first serving grant value of the user equipment according to the minimum value and the first threshold, so that the user equipment can select a minimum value among the first serving grant value, a serving grant value of the user equipment before being updated according to the non-serving relative grant down command, and a maximum serving grant value as a serving grant value of the user equipment, and therefore, it can prevent the serving grant value of the user equipment being excessively low, and avoid that normal communications of the user equipment is affected due to excessively low available power.

Figure 2:
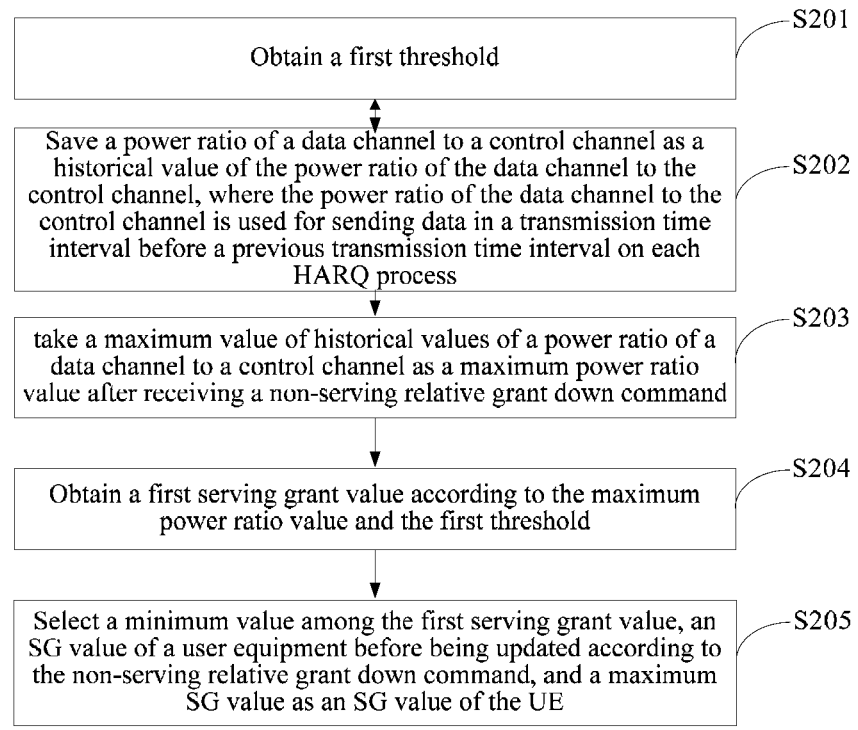
FIG. 2 is a schematic flow chart of a method for processing a serving grant value provided in another embodiment of the present invention.

Another embodiment of the present invention provides a method for processing a serving grant value, and as shown in FIG. 2, the method includes the following steps.

S201: Obtain a first threshold.

Generally, the foregoing first threshold may be set in a user equipment UE, for example, stored in a storage unit of the UE. When the first threshold needs to be used, the UE only needs to invoke the first threshold from the storage unit.

Definitely, the first threshold may be set by a network device, and then the network device sends the first threshold to the UE. For example, the network device may send the first threshold through radio resource control protocol (Radio Resource Control, RRC) signaling, where the RRC signaling may be system information broadcast or dedicated signaling, and the network device sending the first threshold may be a radio network controller (Radio Network Controller, RNC). A form of the first threshold may be a power ratio of a data channel to a control channel, or a serving grant value SG value corresponding to the power ratio in a serving grant table, namely, the first threshold may be a threshold of the power ratio of the data channel to the control channel or a threshold of the SG value.

Alternatively, the first threshold may be calculated through a power ratio of a data channel to a control channel corresponding to a reference transmission block configured by a network. The reference transmission block is configured by the network to the UE, so that the UE calculates a power ratio of a data channel to a control channel that each transmission block needs to use. In an HSUPA operation, the UE saves a transmission block table, in which a series of transmission blocks are stored, the network configures power ratios corresponding to one or more transmission blocks of the transmission blocks for the UE, and then the UE deduces, according to the reference power ratios, a power ratio that a remaining transmission block needs to use, where deduction manners include an interpolation formula method and an extrapolation formula method. For example, reference may be made to a detailed description in the 3GPP (the 3rd Generation Partnership Project, the 3rd generation partnership project) TS 25.321 (all versions following V7.0). If a length of a reference block is L1 and a reference power ratio is P1, power required for a block whose corresponding block length is L2 is L1/L2*P1. The UE can calculate, according to the reference transmission block, a power ratio required for a minimum transmission block required for transmitting data, and can determine a corresponding serving grant value according to the power ratio, where a specific determining method may be: finding, according to the power ratio, a minimum power ratio value in the serving grant table greater than or equal to the power ratio, determining a serving value grant index corresponding to the power ratio as a serving grant value corresponding to the power ratio, and then taking the power ratio as the corresponding first threshold, or taking the serving grant value corresponding to the power ratio as the first threshold.

S202: Save a power ratio of a data channel to a control channel as a historical value of the power ratio of the data channel to the control channel, where the power ratio of the data channel to the control channel is used for sending data in a transmission time interval before a previous transmission time interval on each HARQ process.

HSUPA adopts a multi-path stop-and-wait synchronization HARQ process to perform transmission, and a transmission time interval (Transmission Time Interval, TTI) may be classified into a 2 ms TTI and a 10 ms TTI according to a time length. When the 2 ms TTI is adopted, time from time of sending a data packet to time of receiving data packet acknowledgement information is 16 ms, and each HARQ process occupies a 2 ms TTI, so eight HARQ processes exist in total; and when the 10 ms TTI is adopted, time from time of sending a data packet to time of receiving data packet acknowledgement information is 40 ms, and each HARQ process occupies a 10 ms TTI, so four HARQ processes exist in total.

By taking the 10 ms TTI as an example, four HARQ processes exist in total. It is assumed that process numbers are 0, 1, 2, and 3, each TTI uses processes 0, 1, 2, and 3 sequentially, and a circulation is formed.

In each TTI, the UE may save a power ratio of a data channel to a control channel used at the time of sending data in a previous TTI of an HARQ process corresponding to the TTI into a parameter reference_ETPR, save a power ratio of a data channel to a control channel used at the time of sending data in a TTI before the previous TTI of the HARQ process corresponding to the TTI into a parameter reference_ETPR2, and use the power ratio saved in the parameter reference_ETPR2 as a historical value of the power ratio of the data channel to the control channel. Both the reference_ETPR and the reference_ETPR2 are parameters indicating a ratio of a data channel (Enhance Dedicated Physical Data Channel, E-DPDCH) to a pilot channel (Dedicated Physical Control Channel, DPCCH), namely, a control channel in a protocol.

Exemplarily, by taking the 10 ms TTI as an example, four HARQ processes with process numbers 0 to 3 exist, which are shown in Table 1:

TABLE 1

| TTI | 1 | 2 | 3 | 4 | 5 | 6 | 7 | 8 | 9 | 10 | 11 | 12 |
|---|---|---|---|---|---|---|---|---|---|---|---|---|
| HARQ | 0 | 1 | 2 | 3 | 0 | 1 | 2 | 3 | 0 | 1 | 2 | 3 |
| SG value | | | | | N | N | R | R | R | P-1 | P-1 | |

The first row is a serial number of a TTI, the second row is a process number of an HARQ process, the third row is an SG value corresponding to each HARQ, and each HARQ process occupies one TTI, namely, a number of an HARQ process used in a current TTI is strictly related to time, and the number of the HARQ process used in the current TTI can be calculated according to a current connection frame number and/or subframe number.

For example, assuming it is currently on the tenth TTI, as shown in Table 1, a HARQ process corresponding to the tenth TTI is an HARQ whose serial number is 1. A previous TTI of the HARQ whose serial number is 1 is a sixth TTI, and therefore, a power ratio of a data channel to a control channel used at the time of sending data in a TTI that is the sixth TTI of the HARQ whose serial number is 1 is saved into the parameter reference_ETPR; while a TTI before the previous TTI of the HARQ whose serial number is 1 is a second TTI, and therefore, a power ratio of a data channel to a control channel used at the time of sending data in a TTI that is the second TTI of the HARQ whose serial number is 1 is saved into the parameter reference_ETPR2.

S203: Use a maximum value of historical values of a power ratio of a data channel to a control channel as a maximum power ratio value after receiving a non-serving relative grant down command.

Eight HARQ processes exist in total in the 2 ms TTI, four HARQ processes exist in total in the 10 ms TTI, and on each HARQ process, a power ratio of a data channel to a control channel used at the time of sending data in a TTI before a previous TTI of the HARQ process is saved into the parameter reference_ETPR2, and a plurality of historical values of the power ratio of the data channel to the control channel is saved, and therefore a maximum value needs to be selected.

The foregoing non-serving relative serving grant command is a non-serving RG command, which may be, for example, a public RG command, and two RG values may exist for the non-serving RG: Hold and Down. Down is a non-serving relative grant down command.

When a Hold command is received, processing may not be performed; and after a Down command is received, the UE selects a maximum value from a plurality of historical values of the power ratio of the data channel to the control channel in the reference_ETPR2 as the maximum power ratio value. A network device that sends the non-serving relative serving grant command may be a base station.

S204: Obtain a first serving grant value according to the maximum power ratio value and the first threshold.

Generally, the UE stores an SG Table (serving grant table), and the SG Table includes correspondence between a power ratio of a data channel to a control channel and an SG value, where the power ratio of the data channel to the control channel is adopted by the UE at the time of transmitting data, and each power ratio of a data channel to a control channel is corresponding to one SG value.

After selecting the maximum value from the plurality of historical values of the power ratio of the data channel to the control channel in the reference_ETPR2 as the maximum power ratio value, the UE searches the SG Table for a power ratio of the data channel to the control channel greater than or equal to the maximum power ratio value.

In an implementation manner, when the first threshold is a threshold of an SG value, the UE selects a minimum power ratio value from the found power ratio of the data channel to the control channel greater than or equal to the maximum power ratio value.

Subsequently, the UE determines, according to the SG Table, an SG value corresponding to the foregoing minimum power ratio value, where the SG value corresponding to the minimum power ratio value may be represented as $SG_{LUPR2}$. When $SG_{LUPR2}$ is smaller than or equal to the first threshold, the first threshold is set as the first serving grant value of the UE; and when $SG_{LUPR2}$ is greater than or equal to the first threshold, a value of $SG_{LUPR2}-1$ is set as the first serving grant value of the UE. It may be understood that, as described in the foregoing, for a situation that $SG_{LUPR2}$ is equal to the first threshold, two processing manners are both applicable, which is not limited in this embodiment.

Alternatively, a maximum value is selected from $SG_{LUPR2}-1$ and the first threshold, and the maximum value is set as the first serving grant value of the UE. For example, it may be represented as Serving_Grant=SG[MAX (SGLUPR2-1, predefined SG index)], where Serving_Grant is the first serving grant value, and predefined SG index is the first threshold, indicating that the first threshold is in the form of an index number, that is, the form of an SG value. As described in the following, for a situation that $SG_{LUPR2}-1$ is equal to the first threshold, $SG_{LUPR2}-1$ may be set as the first serving grant value of the UE, or the first threshold may be set as the first serving grant value of the UE, which is not limited in this embodiment.

In another implementation manner, when the first threshold is a threshold of the power ratio of the data channel to the control channel, the UE selects the maximum value from the plurality of historical values of the power ratio of the data channel to the control channel saved in the reference_ETPR2 as the maximum power ratio value and compares the maximum power ratio value with the first threshold.

When the maximum power ratio value is smaller than or equal to the first threshold, an SG value corresponding to the first threshold is determined according to the SG Table, and the SG value corresponding to the first threshold is set as the first serving grant value of the UE.

When the maximum power ratio value is greater than or equal to the first threshold, the SG Table is searched for a power ratio of the data channel to the control channel greater than or equal to the maximum power ratio value, and a minimum power ratio value is selected from the power ratio of the data channel to the control channel greater than or equal to the maximum power ratio value; and then, an SG value corresponding to the foregoing minimum power ratio value is determined according to the SG Table, where the SG value corresponding to the minimum power ratio value may be represented as $SG_{LUPR2}$, and a value of $SG_{LUPR2}-1$ is set as the first serving grant value of the UE.

Alternatively, in another implementation manner, the form of the first threshold is not limited, and the first threshold may be a threshold of the power ratio of the data channel to the control channel, or may be a threshold of an SG value.

When the first threshold is the threshold of the power ratio of the data channel to the control channel, the UE does not execute the non-serving relative grant down command, namely, does not execute the Down command when the maximum power ratio value is smaller than or equal to the first threshold, where it may be understood that, not executing the Down command herein may be understood as holding the serving grant value unchanged; and the UE reduces the first serving grant value of the user equipment according to the non-serving relative serving grant command, namely, executes the Down command, to subtract 1 from the first serving grant value of the user equipment when the maximum power ratio value is greater than or equal to the first threshold.

When the first threshold is the threshold of the SG value:

first the SG Table is searched for a power ratio of the data channel to the control channel greater than or equal to the maximum power ratio value, then a minimum power ratio value is selected from the found power ratio of the data channel to the control channel greater than or equal to the maximum power ratio value, and then an SG value corresponding to the minimum power ratio value is determined in the SG Table, where the SG value corresponding to the minimum power ratio value may be represented as $SG_{LUPR2}$; and the user equipment reduces the first serving grant value of the user equipment according to the Down command when $SG_{LUPR2}$ is greater than or equal to the first threshold; or the user equipment does not execute the Down command when $SG_{LUPR2}$ is smaller than or equal to the first threshold, where it may be understood that, not executing the Down command herein may be understood as holding the serving grant value unchanged.

S205: Select a minimum value among the first serving grant value, an SG value of the user equipment before being updated according to the non-serving relative grant down command, and a maximum SG value as an SG value of the UE, that is, it can be represented as a formula T=Min (maximum SG value, N, and non-serving SG value), where T is the SG value of the user equipment, and N is the SG value of the user equipment before being updated according to the non-serving relative grant down command.

In this way, when a Node B controls interference caused by a UE, a first serving grant value is not reduced anymore after being reduced to a certain value, thereby ensuring that an SG value of a user equipment is not excessively low, and preventing some UEs whose SG values are small originally from further reducing the SG values, so as to ensure that maximum available transmit power of the UE is not excessively low, and avoid an effect on normal communication of the UE.

With the method for processing a serving grant value provided in the embodiment of the present invention, a first serving grant value is obtained according to a power maximum value of historical values of a power ratio of a data channel to a control channel and according to a first threshold, so that a first serving grant value of a user equipment can be prevented from being excessively low, thereby preventing a serving grant value of a user from being excessively low.

Figures 3, 4:
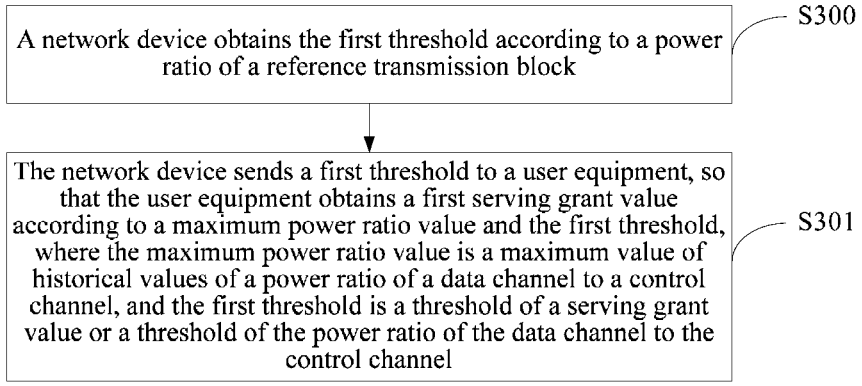
FIG. 3 is a schematic flow chart 1 of a method for processing a serving grant value provided in still another embodiment of the present invention.
FIG. 4 is a schematic flow chart 2 of a method for processing a serving grant value provided in still another embodiment of the present invention.

An embodiment of the present invention further provides a method for processing a serving grant value, and as shown in FIG. 3, the method includes the following steps.

S301: A network device sends a first threshold to a user equipment, so that the user equipment obtains a first serving grant value according to a maximum power ratio value and the first threshold, where the maximum power ratio value is a maximum value of historical values of a power ratio of a data channel to a control channel, and the first threshold is a threshold of a serving grant value or a threshold of the power ratio of the data channel to the control channel.

Each of the historical values of the power ratio of the data channel to the control channel is a power ratio of a data channel to a control channel, where the power ratio of the data channel to the control channel is used for sending data in a transmission time interval before a previous transmission time interval on each hybrid automatic repeat request process.

Further, the network device may send the first threshold to the user equipment through system information broadcast or through dedicated signaling.

Optionally, before the network device sends the first threshold to the user equipment, as shown in FIG. 4, the method may further include the following step.

S300: The network device obtains the first threshold according to a power ratio of a reference transmission block.

Specifically, the first threshold may be obtained through the following method:

the network device determines, according to the power ratio of the reference transmission block, a power ratio required for a minimum block length that is used for transmitting data; and the network device determines the first threshold according to the power ratio required for a minimum block length that is used for transmitting data or a serving grant value corresponding to the power ratio required for a minimum block length that is used for transmitting data.

With the method for processing a serving grant value provided in the embodiment of the present invention, by sending a first threshold to a user equipment, the user equipment obtains a first serving grant value according to a power maximum value of historical values of a power ratio of a data channel to a control channel and according to the first threshold, so that a first serving grant value of a user equipment can be prevented from being excessively low, thereby preventing a serving grant value of a user from being excessively low.

Figure 5:
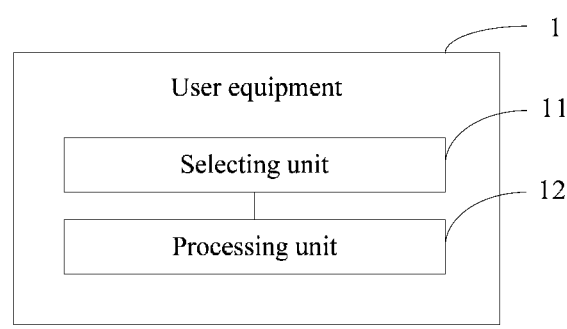
FIG. 5 is a schematic structural diagram 1 of a user equipment provided in an embodiment of the present invention.

Still another embodiment of the present invention provides a user equipment 1, and as shown in FIG. 5, the user equipment 1 includes:

a selecting unit 11, configured to take a maximum value of historical values of a power ratio of a data channel to a control channel as a maximum power ratio value after receiving a non-serving relative grant down command sent by a network device, where each of the historical values of the power ratio of the data channel to the control channel is a saved power ratio of a data channel to a control channel, where the saved power ratio of the data channel to the control channel is used for sending data in a transmission time interval before a previous transmission time interval on each hybrid automatic repeat request process; and a processing unit 12, configured to obtain a first serving grant value according to the maximum power ratio value and a first threshold, where the first threshold is a threshold of a serving grant value or a threshold of the power ratio of the data channel to the control channel.

Figure 6:
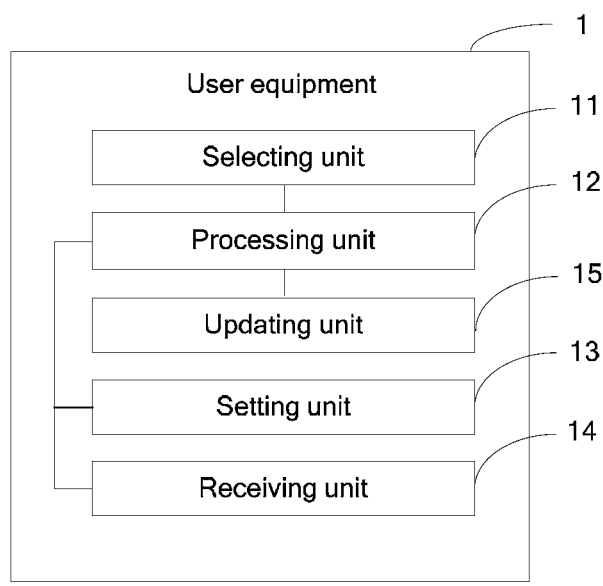
FIG. 6 is a schematic structural diagram 2 of a user equipment provided in an embodiment of the present invention.

Optionally, as shown in FIG. 6, the user equipment 1 may further include:

a setting unit 13, configured to set the first threshold, where for example, the setting unit 13 may obtain the first threshold according to a power ratio of a reference transmission block; and specifically, the setting unit 13 may determine, according to the power ratio of the reference transmission block, a power ratio required for a minimum block length that is used for transmitting data, and then determine the first threshold according to the power ratio required for a minimum block length that is used for transmitting data or according to a serving grant value corresponding to the power ratio required for a minimum block length that is used for transmitting data;

a receiving unit 14, configured to receive the first threshold sent by the network device; and an updating unit 15, configured to take a minimum value among the first serving grant value, a serving grant value of the user equipment before being updated according to the non-serving relative grant down command, and a maximum serving grant value as a serving grant value of the user equipment.

Optionally, the receiving unit 14 may be specifically configured to:

receive the first threshold sent through system information broadcast or through dedicated signaling by the network device.

Figure 7:
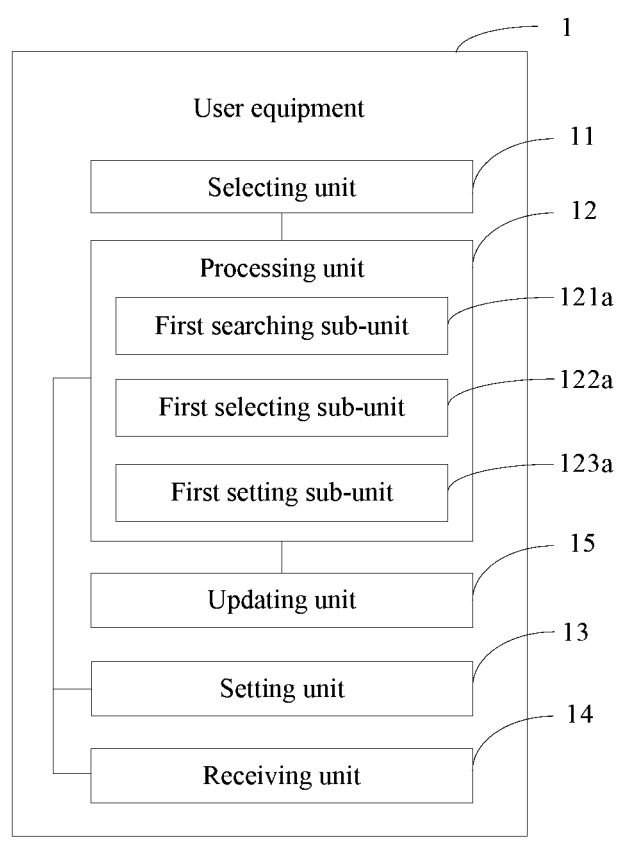
FIG. 7 is a schematic structural diagram 3 of a user equipment provided in an embodiment of the present invention.

Optionally, as shown in FIG. 7, when the first threshold is the threshold of the serving grant value, the processing unit 12 includes:

a first searching sub-unit 121a, configured to search a serving grant table for a power ratio of the data channel to the control channel greater than or equal to the maximum power ratio value;

a first selecting sub-unit 122a, configured to select a minimum power ratio value from the power ratio of the data channel to the control channel greater than or equal to the maximum power ratio value, and determine, according to the serving grant table, a serving grant value corresponding to the minimum power ratio value; and a first setting sub-unit 123a, configured to set the first threshold as the first serving grant value when the serving grant value corresponding to the minimum power ratio value is smaller than or equal to the first threshold; or set a value obtained by subtracting 1 from the serving grant value corresponding to the minimum power ratio value as the first serving grant value when the serving grant value corresponding to the minimum power ratio value is greater than or equal to the first threshold.

Figure 8:
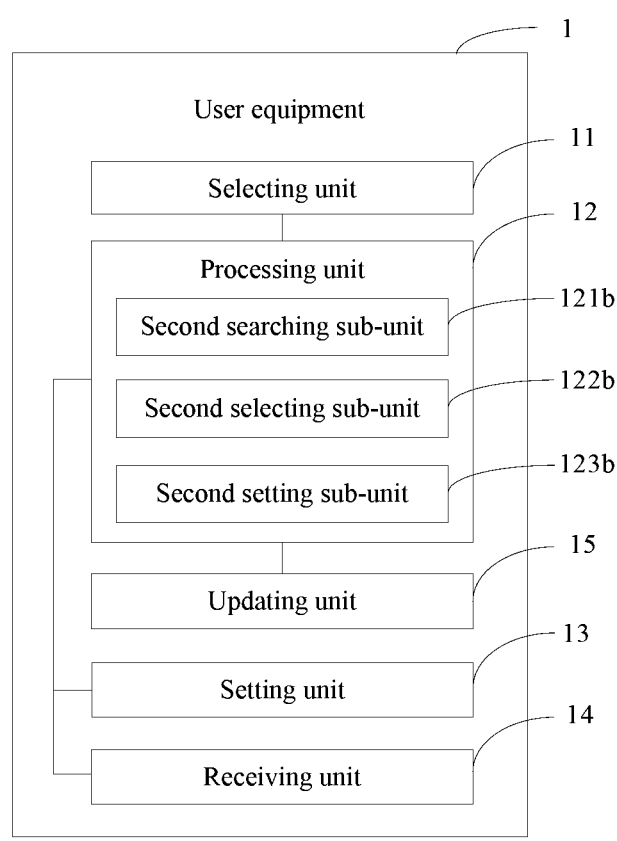
FIG. 8 is a schematic structural diagram 4 of a user equipment provided in an embodiment of the present invention.

An embodiment of the present invention provides another user equipment 1, and as shown in FIG. 8, a processing unit 12 in the user equipment may include:

a second searching sub-unit 121b, configured to search a serving grant table for a power ratio of the data channel to the control channel greater than or equal to the maximum power ratio value;

a second selecting sub-unit 122b, configured to select a minimum power ratio value from the power ratio of the data channel to the control channel greater than or equal to the maximum power ratio value, and determine, according to the serving grant table, a serving grant value corresponding to the minimum power ratio value; and a second setting sub-unit 123b, configured to set a maximum value between a value obtained by subtracting 1 from the serving grant value corresponding to the minimum power ratio value and the first threshold as the first serving grant value.

Figure 9:
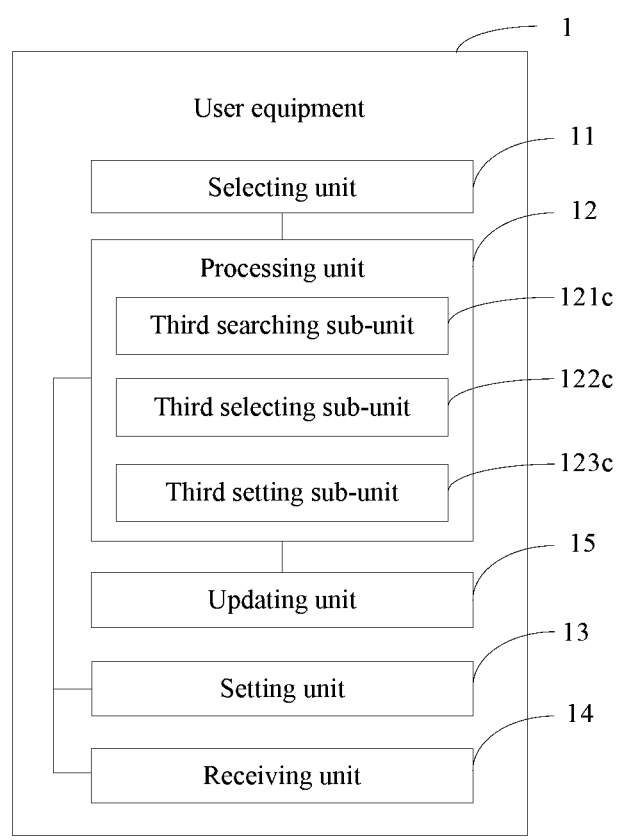
FIG. 9 is a schematic structural diagram 5 of a user equipment provided in an embodiment of the present invention.

When the first threshold is the threshold of the power ratio of the data channel to the control channel, an embodiment of the present invention provides still another user equipment, and as shown in FIG. 9, a processing unit 12 in the user equipment includes:

a third setting sub-unit 123c, configured to, when the maximum power ratio value is smaller than or equal to the first threshold, determine, according to a serving grant table, a serving grant value corresponding to the first threshold, and set the serving grant value corresponding to the first threshold as the first serving grant value;

a third searching sub-unit 121c, configured to, when the maximum power ratio value is greater than or equal to the first threshold, search the serving grant table for a power ratio of the data channel to the control channel greater than or equal to the maximum power ratio value; and a third selecting sub-unit 122c, configured to select a minimum power ratio value from the power ratio of the data channel to the control channel greater than or equal to the maximum power ratio value, where the third setting sub-unit 123c is further configured to determine, according to the serving grant table, a serving grant value corresponding to the minimum power ratio value, and set a value obtained by subtracting 1 from the serving grant value corresponding to the minimum power ratio value as the first serving grant value.

Figure 10:
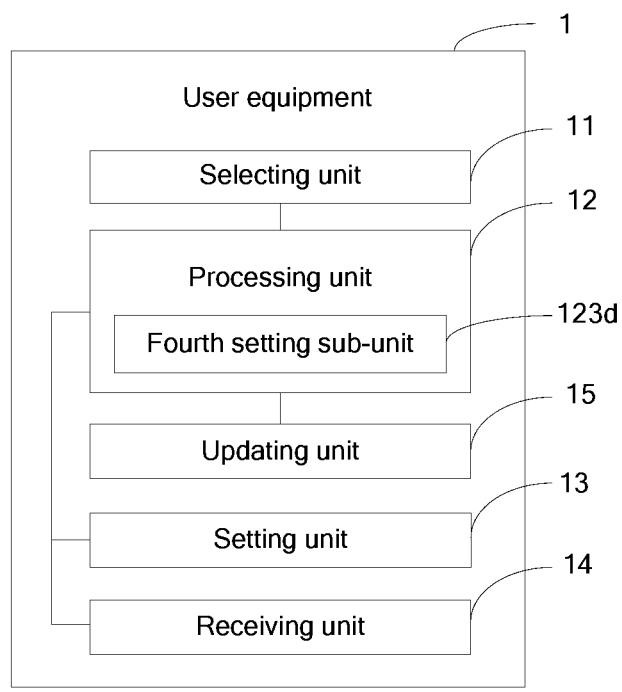
FIG. 10 is a schematic structural diagram 6 of a user equipment provided in an embodiment of the present invention.

An embodiment of the present invention further provides a user equipment 1, and as shown in FIG. 10, a processing unit 12 in the user equipment includes:

a fourth setting sub-unit 123*d*, configured to, when the first threshold is the threshold of the power ratio of the data channel to the control channel, reduce the first serving grant value of the user equipment according to the non-serving relative grant down command when the maximum power ratio value is greater than or equal to the first threshold, or where the fourth setting sub-unit 123*d* is further configured, when the first threshold is the threshold of the power ratio of the data channel to the control channel, not to execute the non-serving relative grant down command when the maximum power ratio value is smaller than or equal to the first threshold.

Alternatively, when the first threshold is the threshold of the serving grant value, the processing unit 12 may further be specifically configured to:

search a serving grant table for a power ratio of the data channel to the control channel greater than or equal to the maximum power ratio value; and select a minimum power ratio value from the power ratio of the data channel to the control channel greater than or equal to the maximum power ratio value, and determine, according to the serving grant table, a serving grant value corresponding to the minimum power ratio value; and reduce the first serving grant value of the user equipment according to the non-serving relative grant down command when the serving grant value corresponding to the minimum power ratio value is greater than or equal to the first threshold; or configured not to execute the non-serving relative grant down command when the serving grant value corresponding to the minimum power ratio value is smaller than or equal to the first threshold.

Optionally, a network device that sends the non-serving relative grant down command may be a base station, and a network device that sends the first threshold may be an RNC.

With the user equipment provided in the embodiment of the present invention, a first serving grant value is obtained according to a power maximum value of historical values of a power ratio of a data channel to a control channel and according to a first threshold, so that a first serving grant value of a user equipment can be prevented from being excessively low, thereby preventing a serving grant value of a user from being excessively low.

Figure 11:
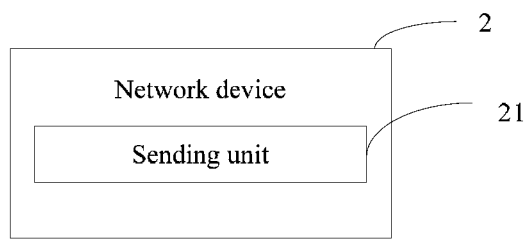
FIG. 11 is a schematic structural diagram 1 of a network device provided in an embodiment of the present invention.

An embodiment of the present invention further provides a network device 2, and as shown in FIG. 11, the network device 2 includes:

a sending unit 21, configured to send a first threshold to a user equipment, so that the user equipment obtains a first serving grant value according to a maximum power ratio value and the first threshold, where the maximum power ratio value is a maximum value of historical values of a power ratio of a data channel to a control channel, and the first threshold is a threshold of a serving grant value or a threshold of the power ratio of the data channel to the control channel.

Each of the historical values of the power ratio of the data channel to the control channel is a power ratio of a data channel to a control channel, where the power ratio of the data channel to the control channel is used for sending data in a transmission time interval before a previous transmission time interval on each hybrid automatic repeat request process.

Optionally, the sending unit 21 is specifically configured to send the first threshold to the user equipment through system information broadcast or through dedicated signaling.

Figure 12:
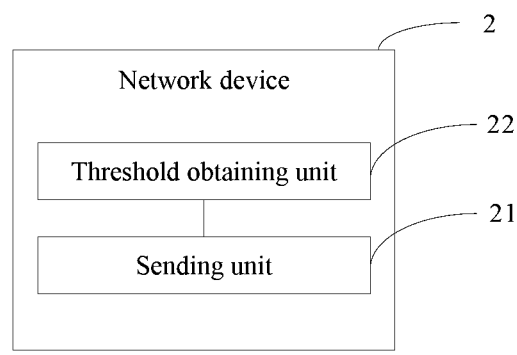
FIG. 12 is a schematic structural diagram 2 of a network device provided in an embodiment of the present invention.

Optionally, as shown in FIG. 12, the network device 2 may further include:

a threshold obtaining unit 22, configured to obtain the first threshold according to a power ratio of a reference transmission block before the first threshold is sent to the user equipment.

The threshold obtaining unit 22 may be specifically configured to:

determine, according to the power ratio of the reference transmission block, a power ratio required for a minimum block length that is used for transmitting data; and determine the first threshold according to the power ratio required for a minimum block length that is used for transmitting data or according to a serving grant value corresponding to the power ratio required for a minimum block length that is used for transmitting data.

The network device 2 may be an RNC.

With the network device provided in the embodiment of the present invention, by sending a first threshold to a user equipment, the user equipment obtains a first serving grant value according to a power maximum value of historical values of a power ratio of a data channel to a control channel and according to the first threshold, so that a first serving grant value of a user equipment can be prevented from being excessively low, thereby preventing a serving grant value of a user from being excessively low.

Figure 13:
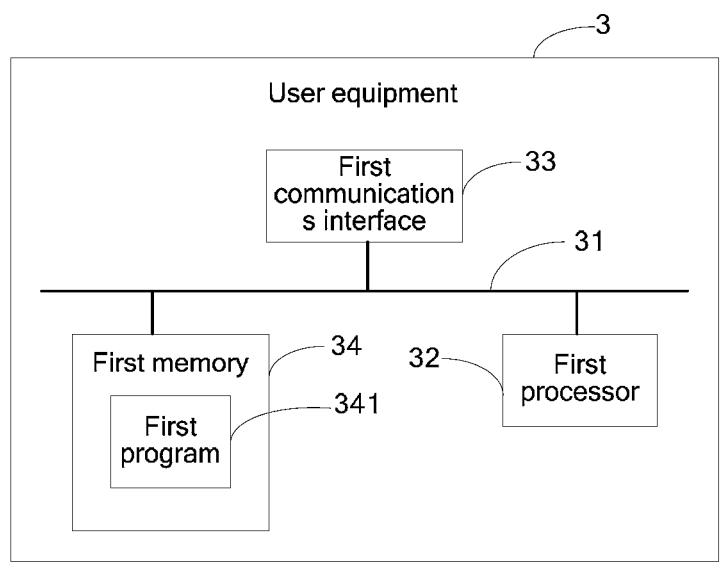
FIG. 13 is a schematic structural diagram of another user equipment provided in an embodiment of the present invention.

An embodiment of the present invention provides another user equipment 3, and as shown in FIG. 13, the user equipment 3 includes a first bus 31; and a first processor 32, a first communications interface 33, and a first memory 34 that are connected to the first bus 31, where the first communications interface 33 is configured to communicate with a network device;

the first memory 34 is configured to store a first program 341;

execution performed by the first processor 32 on the first program 341 is used to take a maximum value of historical values of a power ratio of a data channel to a control channel as a maximum power ratio value after a non-serving relative grant down command sent by the network device is received; and execution performed by the first processor 32 on the first program 341 is further used to obtain a first serving grant value according to the maximum power ratio value and a first threshold, where the first threshold is a threshold of a serving grant value or a threshold of the power ratio of the data channel to the control channel.

Each of the historical values of the power ratio of the data channel to the control channel is a saved power ratio of a data channel to a control channel, where the saved power ratio of the data channel to the control channel is used for sending data in a transmission time interval before a previous transmission time interval on each hybrid automatic repeat request process.

Optionally, execution performed by the first processor 32 on the first program 341 may further be used to set the first threshold; or the first communications interface 33 is configured to receive the first threshold sent by the network device, where for example, the first processor 32 may obtain the first threshold according to a power ratio of a reference transmission block when the first threshold is set; and specifically, the first processor 32 may determine, according to the power ratio of the reference transmission block, a power ratio required for a minimum block length that is used for transmitting data, and then determine the first threshold according to the power ratio required for a minimum block length that is used for transmitting data or according to a serving grant value corresponding to the power ratio required for a minimum block length that is used for transmitting data.

When receiving the first threshold sent by the network device, the first communications interface 33 may receive the first threshold sent through system information broadcast or through dedicated signaling by the network device.

Optionally, execution performed by the first processor 32 on the first program 341 may further be used to:

take a minimum value of the first serving grant value, a serving grant value of the user equipment before being updated according to the non-serving relative grant down command, and a maximum serving grant value as a serving grant value of the user equipment.

Optionally, when the first threshold is the threshold of the serving grant value, execution performed by the first processor 32 on the first program 341 may further be specifically used to:

search a serving grant table for a power ratio of the data channel to the control channel greater than or equal to the maximum power ratio value;

select a minimum power ratio value from the power ratio of the data channel to the control channel greater than or equal to the maximum power ratio value, and determine, according to the serving grant table, a serving grant value corresponding to the minimum power ratio value; and set the first threshold as the first serving grant value when the serving grant value corresponding to the minimum power ratio value is smaller than or equal to the first threshold; or set a value obtained by subtracting 1 from the serving grant value corresponding to the minimum power ratio value as the first serving grant value when the serving grant value corresponding to the minimum power ratio value is greater than or equal to the first threshold.

Optionally, when the first threshold is the threshold of the serving grant value, execution performed by the first processor 32 on the first program 341 may be specifically used to:

search a serving grant table for a power ratio of the data channel to the control channel greater than or equal to the maximum power ratio value;

select a minimum power ratio value from the power ratio of the data channel to the control channel greater than or equal to the maximum power ratio value, and determine, according to the serving grant table, a serving grant value corresponding to the minimum power ratio value; and set a maximum value between a value obtained by subtracting 1 from the serving grant value corresponding to the minimum power ratio value and the first threshold as the first serving grant value.

Optionally, when the first threshold is the threshold of the power ratio of the data channel to the control channel, execution performed by the first processor 32 on the first program 341 may be specifically used to:

when the maximum power ratio value is smaller than or equal to the first threshold, determine, according to a serving grant table, a serving grant value corresponding to the first threshold, and set the serving grant value corresponding to the first threshold as the first serving grant value; or when the maximum power ratio value is greater than or equal to the first threshold, search a serving grant table for a power ratio of the data channel to the control channel greater than or equal to the maximum power ratio value, and select a minimum power ratio value from the power ratio of the data channel to the control channel greater than or equal to the maximum power ratio value; and determine according to the serving grant table, a serving grant value corresponding to the minimum power ratio value, and set a value obtained by subtracting 1 from the serving grant value corresponding to the minimum power ratio value as the first serving grant value.

Optionally, when the first threshold is the threshold of the power ratio of the data channel to the control channel or the first threshold is the threshold of the serving grant value, execution performed by the first processor 32 on the first program 341 may further be specifically used to:

when the first threshold is the threshold of the power ratio of the data channel to the control channel, reduce the first serving grant value of the user equipment according to the non-serving relative grant down command when the maximum power ratio value is greater than or equal to the first threshold; or not execute the non-serving relative grant down command when the maximum power ratio value is smaller than or equal to the first threshold;

or, when the first threshold is the threshold of the serving grant value, search a serving grant table for a power ratio of the data channel to the control channel greater than or equal to the maximum power ratio value;

select a minimum power ratio value from the power ratio of the data channel to the control channel greater than or equal to the maximum power ratio value, and determine, according to the serving grant table, a serving grant value corresponding to the minimum power ratio value; and reduce the first serving grant value of the user equipment according to the non-serving relative grant down command when the serving grant value corresponding to the minimum power ratio value is greater than or equal to the first threshold; or not execute the non-serving relative grant down command when the serving grant value corresponding to the minimum power ratio value is smaller than or equal to the first threshold.

With the user equipment provided in the embodiment of the present invention, a first serving grant value is obtained according to a power maximum value of historical values of a power ratio of a data channel to a control channel and according to a first threshold, so that a first serving grant value of a user equipment can be prevented from being excessively low, thereby preventing a serving grant value of a user from being excessively low.

Figure 14:
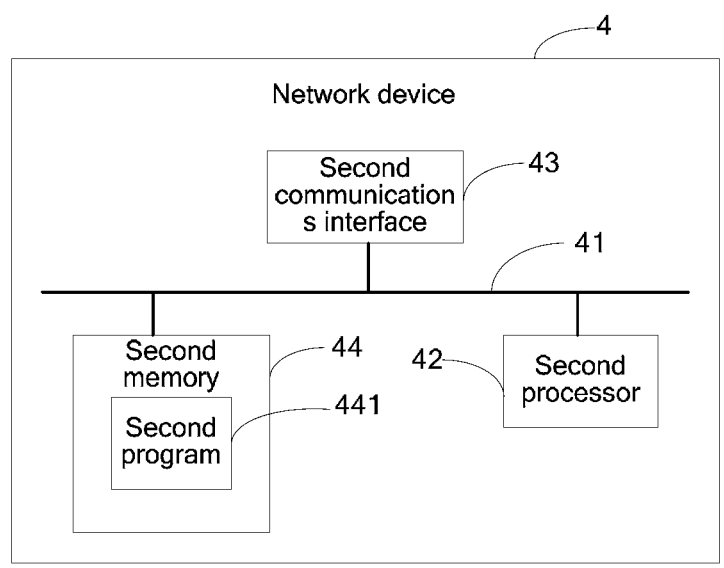
FIG. 14 is a schematic structural diagram of another network device provided in an embodiment of the present invention.

An embodiment of the present invention further provides another network device 4, and as shown in FIG. 14, the network device 4 includes a second bus 41; and a second processor 42, a second communications interface 43, and a second memory 44 that are connected to the second bus 41, where the second communications interface 43 is configured to communicate with a user equipment;

the second memory 44 is configured to store a second program 441; and execution performed by the second processor 42 on the second program 441 is used to instruct the second communications interface to send a first threshold to the user equipment, so that the user equipment obtains a first serving grant value according to a maximum power ratio value and the first threshold, where the maximum power ratio value is a maximum value of historical values of a power ratio of a data channel to a control channel, and the first threshold is a threshold of a serving grant value or a threshold of the power ratio of the data channel to the control channel.

Each of the historical values of the power ratio of the data channel to the control channel is a power ratio of a data channel to a control channel, where the power ratio of the data channel to the control channel is used for sending data in a transmission time interval before a previous transmission time interval on each hybrid automatic repeat request process.

Optionally, the second communications interface 43 is specifically configured to:

send the first threshold to the user equipment through system information broadcast or through dedicated signaling.

Optionally, before the first threshold is sent to the user equipment, execution performed by the second processor 42 on the second program 441 may be used to obtain the first threshold according to a power ratio of a reference transmission block.

Specifically, the following is included: determining, according to the power ratio of the reference transmission block, a power ratio required for a minimum block length that is used for transmitting data, and determining the first threshold according to the power ratio required for a minimum block length that is used for transmitting data or according to a serving grant value corresponding to the power ratio required for a minimum block length that is used for transmitting data.

Optionally, the network device 4 is a radio network controller.

With the network device provided in the embodiment of the present invention, by sending a first threshold to a user equipment, the user equipment obtains a first serving grant value according to a power maximum value of historical values of a power ratio of a data channel to a control channel and according to the first threshold, so that a first serving grant value of a user equipment can be prevented from being excessively low, thereby preventing a serving grant value of a user from being excessively low.

All or a part of the steps of the foregoing method embodiments may be implemented by a program instructing relevant hardware. The foregoing program may be stored in a computer readable storage medium. When the program runs, the steps of the foregoing method embodiments are performed. The foregoing storage medium includes any medium that can store program code, such as a USB flash drive, a removable hard disk, a read-only memory (Read-Only Memory, ROM for short), a random access memory (Random Access Memory, RAM for short), a magnetic disk, or an optical disc.

Functional units of the user equipment in the embodiments of the present invention may be integrated into one processing unit, or each of the units may exist alone physically, or two or more units are integrated into one unit. The foregoing unit may be implemented through hardware, or may be implemented in the form of hardware plus a software functional unit.

The foregoing descriptions are merely specific embodiments of the present invention, but are not intended to limit the protection scope of the present invention. Any variation or replacement that can be readily figured out by a person skilled in the art within the technical scope disclosed in the present invention shall all fall within the protection scope of the present invention. Therefore, the protection scope of the present invention shall be subject to the protection scope of the claims.

What is claimed is:

1. A method for processing a serving grant value, the method comprising:
   taking, by a user equipment, a maximum value of historical values of a power ratio of a data channel to a control channel as a maximum power ratio value after receiving a non-serving relative grant down command sent by a network device; and
   obtaining, by the user equipment, a first serving grant value according to the maximum power ratio value and a first threshold of a serving grant value corresponding to a minimum power ratio value, where the first serving grant value is 1 less than the serving grant value corresponding to the minimum power ratio value when the minimum power ratio value is greater than or equal to the first threshold and the minimum power ratio value is selected from a power ratio of the data channel to the control channel greater than or equal to the maximum power ratio value.

2. The method according to claim 1, wherein each of the historical values is the power ratio of the data channel to the control channel, wherein the power ratio of the data channel to the control channel is used for sending data in a transmission time interval before a previous transmission time interval on each hybrid automatic repeat request process.

3. The method according to claim 1, wherein the first threshold is at first received by the user equipment and sent by the network device.

4. The method according to claim 3, wherein that the first threshold is at first received by the user equipment and sent by the network device comprises:
   the first threshold is received by the user equipment and sent through system information broadcast or through dedicated signaling by the network device.

5. The method according to claim 1, wherein when the first threshold is the threshold of the serving grant value, the obtaining, by the user equipment, the first serving grant value according to the maximum power ratio value and the first threshold comprises:
   skipping executing, by the user equipment, the non-serving relative grant down command when a serving grant value corresponding to the minimum power ratio value is smaller than or equal to the first threshold;
   wherein the minimum power ratio value is selected from a power ratio of the data channel to the control channel greater than or equal to the maximum power ratio value.

6. The method according to claim 1, further comprising taking, by the user equipment, a current serving grant value of the user equipment to be a minimum value of the first serving grant value.

7. The method according to claim 1, wherein the first threshold is set by the user equipment.

8. The method according to claim 1 further comprising taking, by the user equipment, a current serving grant value of the user equipment to be a minimum value of a serving grant value of the user equipment before being updated according to the non-serving relative grant down command.

9. The method according to claim 1 further comprising taking, by the user equipment, a current serving grant value of the user equipment to be a minimum value of a maximum serving grant value.

10. A user equipment comprising: a processor and a memory coupled to the processor;
    wherein the processor is configured to;
    take a maximum value of historical values of a power ratio of a data channel to a control channel as a maximum power ratio value after receiving a non-serving relative grant down command sent by a network device and obtain a first serving grant value according to the maximum power ratio value and a first threshold, where the first serving grant value is 1 less than the serving grant value corresponding to a minimum power ratio value when the minimum power ratio value is greater than or equal to the first threshold and the minimum power ratio value is selected from a power ratio of the data channel to the control channel greater than or equal to the maximum power ratio value, wherein the first threshold is a threshold of a serving grant value.

11. The user equipment according to claim 10, wherein each of the historical values of the power ratio of the data channel to the control channel is a saved power ratio of the data channel to the control channel, wherein the saved power ratio of the data channel to the control channel is used for sending data in a transmission time interval before a previous transmission time interval on each hybrid automatic repeat request process.

12. The user equipment according to claim 10, wherein the user equipment is further configured to:
set the first threshold, or configured to receive the first threshold sent by the network device.

13. The user equipment according to claim 12, wherein the user equipment is configured to:
receive the first threshold sent through system information broadcast or through dedicated signaling by the network device.

14. The user equipment according to claim 10, wherein the user equipment is further configured to:
obtain the first threshold according to a power ratio of a reference transmission block.

15. The user equipment according to claim 14, wherein the user equipment is further configured to:
determine, according to the power ratio of the reference transmission block, a power ratio required for a minimum block length that is used for transmitting data; and
determine the first threshold according to the power ratio required for the minimum block length that is used for transmitting the data or according to a serving grant value corresponding to the power ratio required for the minimum block length that is used for transmitting the data.

16. The user equipment according to claim 10, wherein when the first threshold is the threshold of the serving grant value, the processor is configured to:
skip executing the non-serving relative grant down command when a serving grant value corresponding to a minimum power ratio value is smaller than or equal to the first threshold; wherein the minimum power ratio value is selected from a power ratio of the data
channel to the control channel greater than or equal to the maximum power ratio value.

17. The user equipment according to claim 10, wherein the processor is further configured to:
take a current serving grant value of the user equipment to be a minimum value of the first serving grant value.

18. The user equipment according to claim 10, wherein the processor is further configured to take a current serving grant value of the user equipment to be a minimum value of a serving grant value of the user equipment before being updated according to the non-serving relative grant down command.

19. The user equipment according to claim 10, wherein the processor is further configured to take a current serving grant value of the user equipment to be a minimum value of a maximum serving grant value.

* * * * *